United States Patent
Robertson

(10) Patent No.: US 7,298,758 B2
(45) Date of Patent: Nov. 20, 2007

(54) METHOD AND SYSTEM FOR OPTIMIZING UTOPIA CLAV POLLING ARBITRATION

(75) Inventor: Clement Robertson, Cambridgeshire (GB)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 909 days.

(21) Appl. No.: 10/615,613

(22) Filed: Jul. 8, 2003

(65) Prior Publication Data

US 2004/0151200 A1  Aug. 5, 2004

Related U.S. Application Data

(60) Provisional application No. 60/393,739, filed on Jul. 8, 2002.

(51) Int. Cl.
  *H04L 12/42* (2006.01)
  *H04L 12/403* (2006.01)
(52) U.S. Cl. .................. 370/449; 370/461; 370/462
(58) Field of Classification Search .............. None
   See application file for complete search history.

(56) References Cited

U.S. PATENT DOCUMENTS

| | | | |
|---|---|---|---|
| 5,418,786 A | | 5/1995 | Loyer et al. |
| 5,659,787 A | * | 8/1997 | Schieltz ..................... 709/226 |
| 6,006,017 A | | 12/1999 | Joshi et al. |
| 6,098,109 A | | 8/2000 | Kotzur et al. |
| 6,188,690 B1 | | 2/2001 | Holden et al. |
| 6,198,750 B1 | | 3/2001 | Buchholz et al. |
| 6,266,324 B1 | | 7/2001 | Kirino et al. |
| 6,307,858 B1 | | 10/2001 | Mizukoshi et al. |
| 6,345,050 B1 | | 2/2002 | Alleyne et al. |
| 6,356,557 B1 | | 3/2002 | Nichols et al. |
| 6,389,480 B1 | | 5/2002 | Kotzur et al. |
| 6,449,655 B1 | * | 9/2002 | Hann et al. .................. 709/233 |
| 6,535,520 B1 | * | 3/2003 | Hann et al. .................. 370/461 |
| 2002/0009089 A1 | | 1/2002 | McWilliams |
| 2003/0091053 A1 | * | 5/2003 | Tzannes et al. ........... 370/395.1 |

OTHER PUBLICATIONS

The ATM Forum Technical Committee, Utopia Level 2, Version 1.0, Jun. 1995, pp. 1-66.
International Search Report dated May 21, 2004 for Application No. PCT/US03/21359.

* cited by examiner

*Primary Examiner*—Chau Nguyen
*Assistant Examiner*—Suk Jin Kang
(74) *Attorney, Agent, or Firm*—Thomas, Kayden, Horstemeyer & Risley LLP

(57) ABSTRACT

The present invention is directed to methods and systems for optimizing UTOPIA CLAV polling arbitration. According to an aspect of the present invention, UTOPIA L2 CLAV status polling of each PHY address may be optimized by polling PHY addresses that have not yet indicated an active CLAV status or have just finished a cell transfer so that a CLAV response is required again. According to another aspect of the present invention, UTOPIA L2 CLAV status polling may be arbitrated so faster connection PHY addresses are polled proportionally more often than slower connection PHY addresses. According to yet another aspect of the present invention, if a connection speed no longer has any PHY addresses which require polling, the arbitration may be altered so only the connection speed with PHY addresses which require polling are actually polled. This ensures that the polling bandwidth is used as efficiently as possible.

21 Claims, 19 Drawing Sheets

METHOD AND SYSTEM FOR OPTIMIZING UTOPIA CLAV POLLING ARBITRATION

CROSS-REFERENCE TO RELATED APPLICATIONS

This patent application claims priority to U.S. Provisional Patent Application No. 60/393,739 filed Jul. 8, 2002, which is hereby incorporated by reference herein in its entirety.

FIELD OF THE INVENTION

The present invention relates generally to optimizing Universal Test and Operations Physical Interface for Asynchronous Transfer Mode (UTOPIA) Cell Available (CLAV) polling arbitration and, more particularly, to optimizing UTOPIA repeat CLAV polling; basing UTOPIA polling arbitration on Asynchronous Transfer Mode (ATM) connection speed; and combining UTOPIA CLAV optimization and polling arbitration for further enhancements in performance and efficiency.

BACKGROUND OF THE INVENTION

The ATM Forum UTOPIA L2 Technical Specification af-phy-0039.000 states that a maximum of 26 Physical Interface (PHY) addresses can be polled within one cell transfer of 53 bytes. This is assuming that the PHY can give a CLAV response within 1 clock cycle. If additional clock cycles are required for the PHY to respond to a PHY address, then less than 26 PHY addresses can be polled within one cell transfer.

The convention is to use single CLAV status polling to poll up to 31 PHY addresses, which is more than the maximum polling bandwidth of a single CLAV status signal. A common way of increasing the polling bandwidth is to add additional CLAV status signals to cover the number of PHY addresses being polled. However, this requires the PHY to support more than one CLAV signal. This is known as Multiple Status Polling (MSP). MSP does not address the issue that more PHY addresses may require polling than the maximum achievable polling bandwidth of one CLAV signal.

A master device generally has the task of polling the PHY addresses. A PHY address may return an active CLAV status indicating that it is ready for another transfer, unless this PHY is physically removed from the system. The CLAV status response for that specific PHY address will not change for successive polls until a cell has been transferred on that PHY address.

For each CLAV status signal, more PHY addresses may require polling than can be polled within one cell transfer period (e.g., 53 clock cycles). For example, a majority of PHY addresses may be deemed slow connection PHY addresses. Periodically, the latency of polling fast connection PHY addresses may exceed more than a cell period. For example, fast connection PHY addresses can indicate up to 100 CLAV statuses within a period of 2 successive slow connection CLAV statuses. By not checking the fast connection CLAV status often enough, the fast connection may become congested further back in a network. In addition, if all PHY addresses at one connection speed have indicated an active CLAV and have yet to be serviced, polling bandwidth will be wasted each time the connection speed, with no PHY addresses requiring polling, is selected by a polling arbiter.

When using Multiple CLAV status polling (MSP), where up to four independent PHY CLAV responses are received for each PHY address, CLAV polling optimization can only occur once all CLAV status for that PHY address are flagging an active CLAV status. Once any one of those CLAV statuses for that PHY address has been serviced where the CLAV status for that PHY address is unknown, then all CLAV statuses for that PHY address must be checked again.

MSP increases polling bandwidth by using more CLAV status signals. However, this requires the PHY to accept more than one CLAV status signal or multiple PHYs are required. If multiple CLAV status polling is performed, more than one PHY is polled per PHY address so each PHY address may have more than one CLAV status signal. When one PHY indicates an active CLAV status, the other PHYs using that PHY address may not yet have indicated an active CLAV status. This means the PHY addresses are polled again until all CLAV statuses for that PHY address indicate an active CLAV status and have yet to be serviced.

The UTOPIA device within a Helium 210 Chip may poll 31 PHY address in a method specified by the ATM forum UTOPIA L2 specification af-phy-0039.000. Using a single CLAV status polling method, each PHY address is polled in turn, starting at address 0x00 through to address 0x1E. The Null PHY address 0x1F is polled between each polled PHY address to allow the PHY to respond. The means that only 26 PHY addresses can be polled for every cell transferred (53 UTOPIA interface clock cycles). This polling limitation generally is difficult to overcome but the efficiency of the polling can be improved to ensure that only PHY addresses, which require polling, are polled.

Current technology implements three polling specs defined within the ATM forum UTOPIA L2 spec af-phy-0039.000. These polling specs are Single CLAV status polling; Multiplexed CLAV status polling (MSP) using 4 CLAV signals; and Direct CLAV status indication using four CLAV status signals.

Therefore, there is a need for a more efficient method and system for optimizing UTOPIA CLAV polling arbitration.

SUMMARY OF THE INVENTION

Aspects of the present invention overcome the problems noted above, and realize additional advantages. In one exemplary embodiment, UTOPIA L2 CLAV status polling of each PHY address may be optimized by polling PHY addresses that have not yet indicated an active CLAV status or have just finished a cell transfer so that a CLAV response is required again. According to another exemplary embodiment of the present invention, UTOPIA L2 CLAV status polling may be arbitrated so faster connection PHY addresses are polled proportionally more often than slower connection PHY addresses. According to yet another exemplary embodiment of the present invention, if a connection speed no longer has any PHY addresses which require polling, the arbitration may be altered so only the connection speed with PHY addresses which require polling are actually polled. This ensures that the polling bandwidth is used efficiently.

According to one particular exemplary embodiment, a method for optimizing cell available (CLAV) status polling comprises the steps of determining a first connection speed having a first associated set of PHY addresses and a second connection speed having a second associated set of PHY addresses; arbitrating status polling based at least in part on a polling ratio involving the first connection speed and the second connection speed; polling the first and second associated set of PHY addresses to determine a CLAV status for each PHY address, according to the polling ratio; determining whether each PHY address of the first and second connection speed requires polling; and re-polling at a connection speed wherein at least one PHY address of the connection speed requires polling.

In accordance with other aspects of this particular exemplary embodiment of the present invention, the polling ratio is based on a number of PHY addresses of the first connection speed and a number of PHY addresses of the second connection speed; the method further comprises the step of updating the polling ratio based on a number of PHY addresses of the first connection speed that require polling and a number of PHY addresses of the second connection speed that require polling; the step of determining whether each PHY address requires polling further comprises the step of determining whether the CLAV status is an active CLAV status; the method further comprises the step of determining whether the PHY address with an active CLAV status has been serviced; PHY addresses with an active CLAV status that have not been serviced are not re-polled wherein bandwidth is conserved; the polling ratio comprises a plurality of polling ratios; the poll ratios include 0/100, 25/75, 50/50, 75/25, 100/0 wherein each poll ratio represents the first connection speed to the second connection speed; one or both of the first connection speed and the second connection speed are software configurable; and the first connection speed is a fast connection speed and the second connection speed is a slow connection speed.

According to another particular exemplary embodiment, a system for optimizing cell available (CLAV) status polling comprises a determining connection speed module for determining a first connection speed having a first associated set of PHY addresses and a second connection speed having a second associated set of PHY addresses; an arbitrating status polling module for arbitrating status polling based at least in part on a polling ratio involving the first connection speed and the second connection speed; a polling module for polling the first and second associated set of PHY addresses to determine a CLAV status for each PHY address, according to the polling ratio; a determining PHY address status module for determining whether each PHY address of the first and second connection speed requires polling; and a re-polling module for re-polling at a connection speed wherein at least one PHY address of the connection speed requires polling.

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention can be understood more completely by reading the following Detailed Description of the Invention, in conjunction with the accompanying drawings, in which.

DETAILED DESCRIPTION OF THE INVENTION

Figure 1:
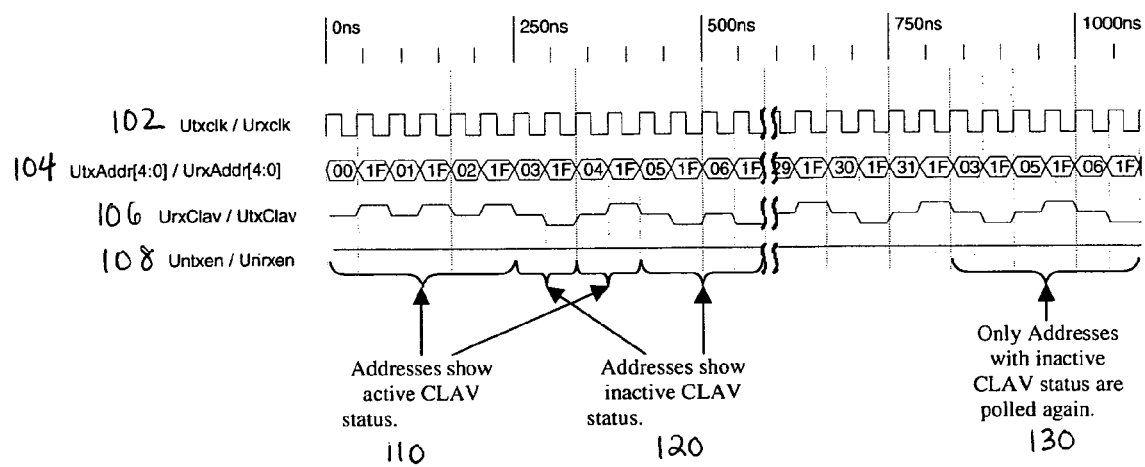
FIG. 1 illustrates an example of CLAV polling in accordance with an embodiment of the present invention.

The following description is intended to convey a thorough understanding of the invention by providing a number of specific embodiments and details related to optimizing UTOPIA CLAV polling arbitration. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Polling may involve a master device (e.g., a level 2 master device, etc.) that constantly polls a bus to determine the status of a plurality of slave devices. In particular, a transmit master device may poll the bus to determine which slave devices are able to receive a cell. Further, a receive master may poll the bus to determine which slave devices are ready to transmit a cell. Ports that are enabled will be polled where ports are enabled by setting bits in the TX_and RX_POLL_ENABLE registers.

Status polling may be performed by using a simple two-clock sequence that uses one clock status and one clock select to collect the information. This process may continue even while data transmission/reception is taking place. For UTOPIA Level 2 Master (L2M) polling by a Transmit (Tx) master, the master may poll the UTOPIA bus by driving the Tx address lines and may continue even while it is transmitting a cell. Slave receivers may respond by asserting the TX_CLAV line if the receivers are able to receive a cell. Once the master has determined that a slave receive is able to receive a cell, the master no longer polls that device. For L2M polling by a Receive (Rx) master, the master may poll the UTOPIA bus by driving the Rx address lines. The master may continue polling even while it is receiving a cell. Slave receivers may respond by asserting the TX_CLAV line if the receivers have a cell available for transmission. Once the master has determined that a slave transmitter has a cell ready for transmission, the master no longer polls that device.

According to an embodiment of the present invention, UTOPIA L2 CLAV status polling of each PHY address may be optimized by polling PHY addresses that have not yet indicated an active CLAV status or have just finished a cell transfer so that a CLAV response is required again. The PHY CLAV polling bandwidth may be utilized more efficiently to work around the limitations of a maximum of 26 PHY addresses that can be polled in one cell period (e.g., one ATM cell period).

The repeated CLAV status polling of a PHY address with an active CLAV status may be considered as wasted polling bandwidth. According to an embodiment of the present invention, a basic polling method may be enhanced, in one respect, where PHY addresses, which have not indicated an active CLAV status or have just finished a cell transfer, are polled. As a result, the CLAV status polling bandwidth is ensured to limit polling to PHY addresses where the CLAV status could change.

Figure 2:
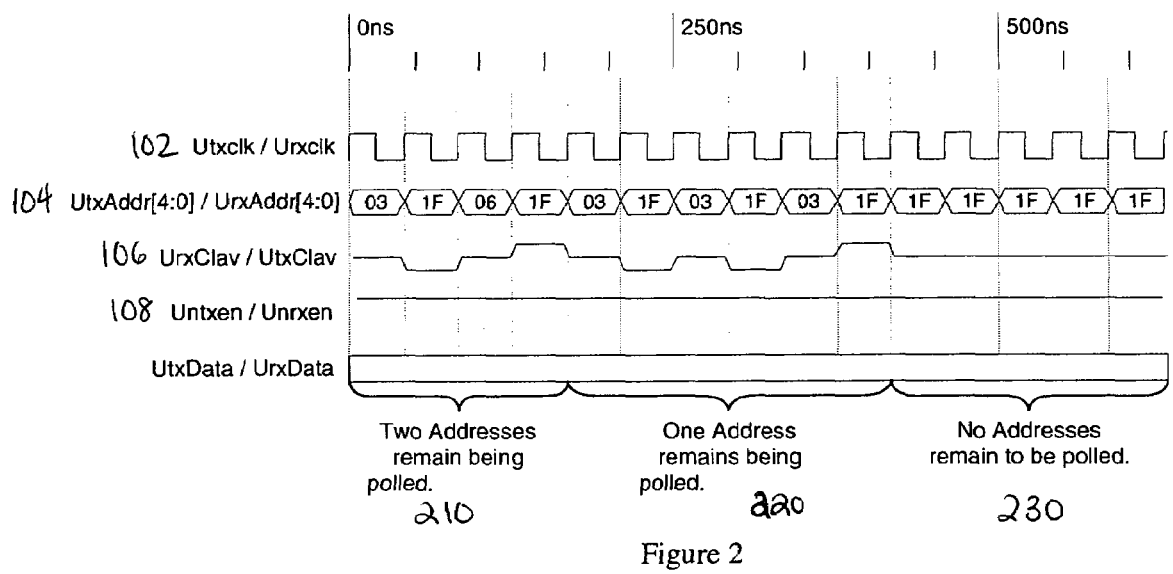
FIG. 2 illustrates an example of CLAV polling in accordance with an embodiment of the present invention.

Two examples of the enhanced CLAV polling are illustrated in FIG. 1 and FIG. 2. FIG. 1 illustrates an enhanced CLAV polling in accordance with an embodiment of the present invention. Utxclk/Urxclk 102 represents UTOPIA transmitter clock/UTOPIA receiver clock. UtxAddr/UrxAddr 104 represents UTOPIA transmitter address/UTOPIA receiver address. UrxClav/UtxClav 106 represents UTOPIA receive cell available/UTOPIA transmitter cell available. Urtxen/Unrxen 108 represents UTOPIA transmitter enable/UTOPIA receiver enable. As illustrated in FIG. 1, some addresses show an active CLAV status 110, as shown by UrxClav/UtxClav 106. For example, address 00, 01, 02 and 04 have responded with an active CLAV status. Thus, these addresses do not need to be polled again until the address is serviced. Addresses 03, 05 and 06 indicate an inactive CLAV status 120. Therefore, the inactive addresses are polled again as shown by 130 until these addresses show an active CLAV status, in accordance with an embodiment of the present invention. After all enabled addresses have been polled, the addresses with inactive CLAV status are polled again, namely addresses 03, 05 and 06.

For example, more than 26 PHY addresses may be enabled for polling where none have asserted an active CLAV response. In the example of FIG. 1, a worst case polling loop, where none of the 31 PHY addresses show an active CLAV response, will exceed the polling bandwidth of 26 PHY address in one service cycle. But, on average, polling loops will be within the maximum bandwidth of 26 PHY addresses per service cycle due to the time it takes to service existing active CLAV requests.

Enabled PHY addresses may flag an active CLAV where a cell transfer has not taken place or finished. When there are no PHY addresses requiring polling, the NULL PHY address will be polled until a PHY address requires polling. FIG. 2 illustrates a situation when no PHY address requires polling. In this situation, a null PHY address may be polled (e.g., do nothing). In this example, two addresses remain to be polled as shown by 210, namely addresses 03 and 06. After address 06 indicates an active CLAV status, only one address 03 remains to be polled. The remaining address 03 is polled until an active CLAV status is received, as shown by 220. When no addresses remain to be polled, there is no need to do anything, as shown by a series of IF addresses 230.

For a receive, the CLAV status for a specific PHY address may be polled again within the last 4 bytes of a previous transfer. This gives an interface the opportunity of performing back to back cell transfers on the same PHY address with a minimal setup delay between transfers. For a transmit, the CLAV status for a specific PHY address may be polled immediately after the previous transfer finishes.

Figure 3:
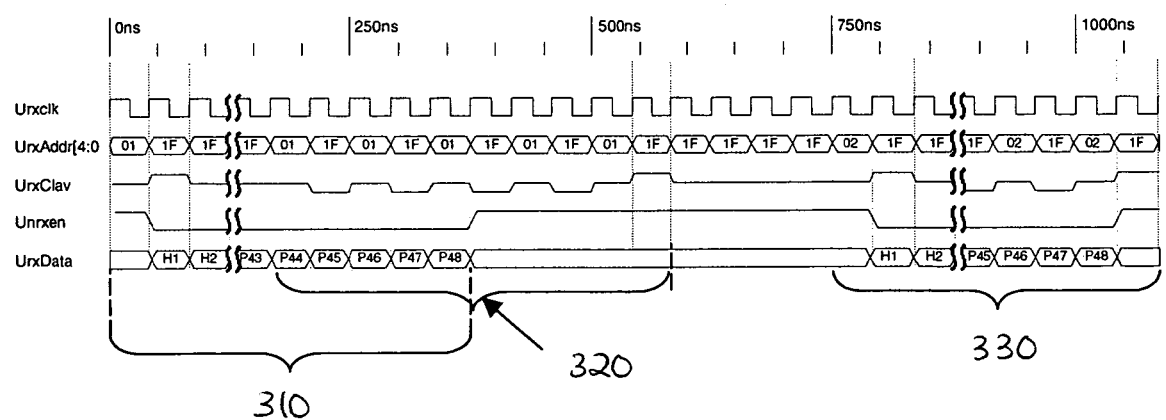
FIG. 3 illustrates an example of CLAV polling where Receive (Rx) PHY addresses are polled in accordance with an embodiment of the present invention.

FIG. 3 illustrates an example of CLAV polling where Receive (Rx) PHY addresses are polled in accordance with an embodiment of the present invention. In particular, FIG. 3 illustrates a situation where a Rx PHY address is polled again once a previous Rx PHY address has been serviced (e.g., within 4 bytes of end of transfer) in accordance with an embodiment of the present invention. For example, when an address is serviced, the CLAV status of the address may be checked within the last word of transfer (e.g., 4 bytes) on the receive side, as shown by 310. Addresses just serviced may be polled again to obtain a CLAV status, as shown by 320. When the address is serviced, the CLAV status of the address may be checked within the last word of transfer, as shown by 330.

Figure 4:
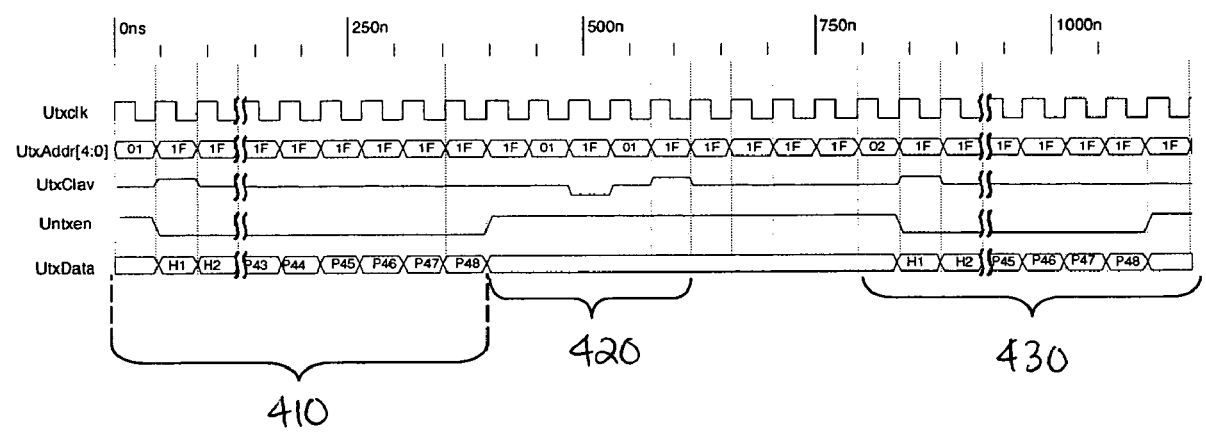
FIG. 4 illustrates an example of CLAV polling where Transmit (Tx) PHY addresses are polled in accordance with an embodiment of the present invention.

FIG. 4 illustrates an example of CLAV polling where Transmit (Tx) PHY addresses are polled in accordance with an embodiment of the present invention. In particular, FIG. 4 illustrates a situation where a Tx PHY address is polled again once a previous Tx PHY address has been serviced in accordance with an embodiment of the present invention. In this example, when an address is serviced, CLAV status cannot be checked until the end of a transfer, as shown by 410. As shown in FIG. 4, the address just serviced may be polled again to obtain CLAV status, as shown by 420. When the address is serviced, CLAV status of the address may be checked within the last word of transfer, as shown by 430.

Figure 5:
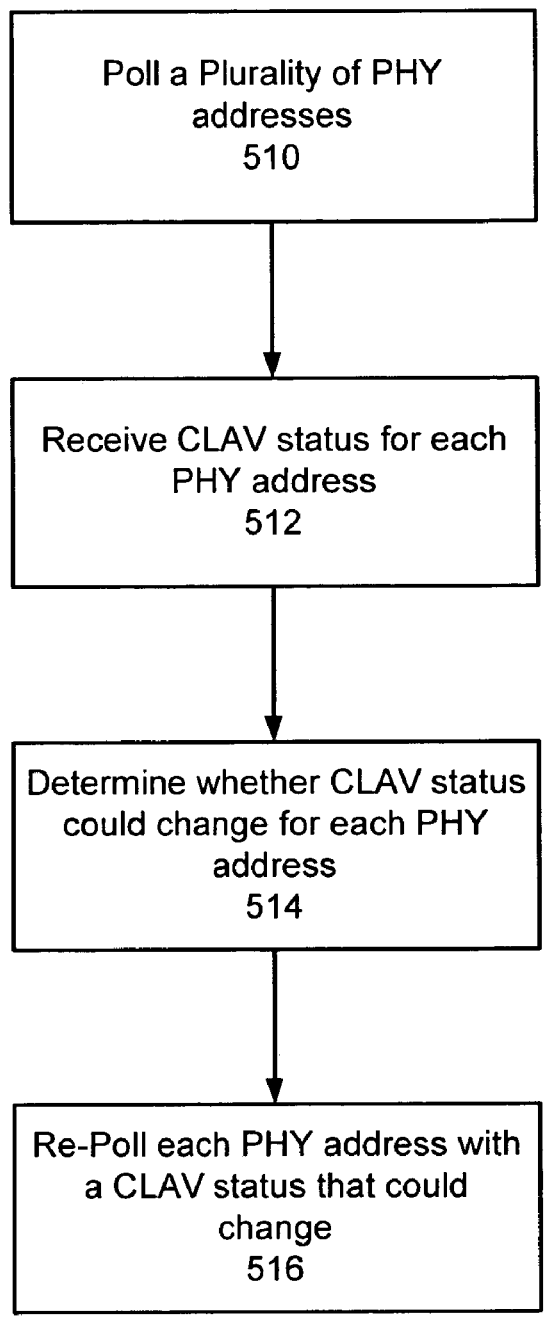
FIG. 5 is an exemplary flowchart illustrating a method for optimizing CLAV status polling, in accordance with an embodiment of the present invention.

FIG. 5 is an exemplary flowchart illustrating a method for optimizing CLAV status polling, in accordance with an embodiment of the present invention. At step 510, a plurality of PHY addresses may be polled to determine CLAV status. At step 512, the CLAV status for each one of the plurality of PHY addresses may be received. At step 514, whether the CLAV status could change for each PHY address may be determined. At step 516, each PHY address with a CLAV status that could change may be re-polled. For example, the CLAV status that could change may include an inactive CLAV status and a completed cell transfer. Thus, the step of re-polling may further include the step of re-polling addresses with an inactive CLAV status and/or the step of re-polling addresses having completed a cell transfer. Further, re-polling of PHY addresses having an active CLAV status may be avoided thereby conserving resources.

Figure 6:
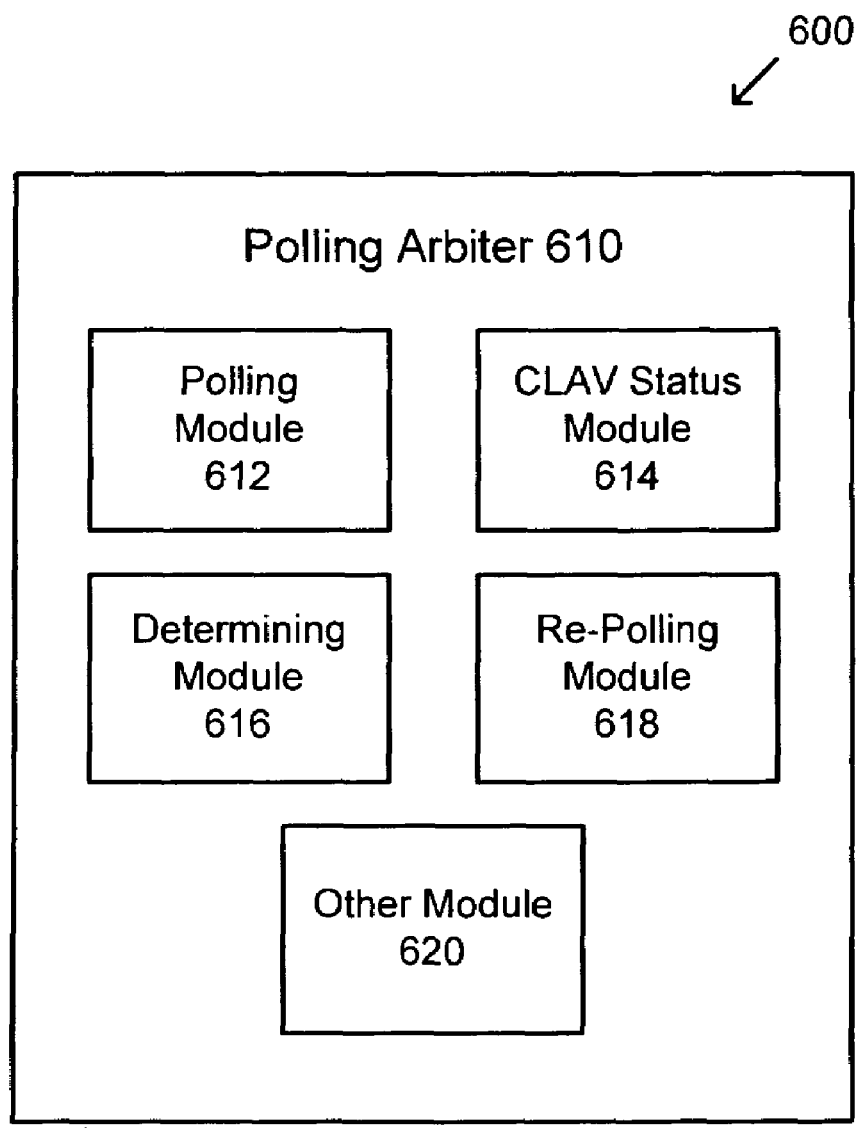
FIG. 6 is an exemplary diagram illustrating a system for optimizing CLAV status polling, in accordance with an embodiment of the present invention.

FIG. 6 is an exemplary diagram illustrating a system for optimizing CLAV status polling, in accordance with an embodiment of the present invention. System 600 may include a Polling Arbiter 610 for optimizing cell available (CLAV) status polling of a plurality of physical interface addresses. Polling Arbiter 610 may include a Polling Module 612, a CLAV Status Module 614, a Determining Module 616, a Re-Polling Module 618 and Other Module 620. Polling Module 612 may poll a plurality of PHY addresses to determine CLAV status. CLAV Status Module 614 may receive the CLAV status for each one of the plurality of PHY addresses. Determining Module 616 may determine whether the CLAV status could change for each PHY address. Re-Polling Module 618 may re-polling each PHY address with a CLAV status that could change. As discussed above, the CLAV status that could change may include an inactive CLAV status and a completed cell transfer. Thus, the Re-Polling Module 618 may further include re-polling addresses with an inactive CLAV status and/or re-polling addresses having completed a cell transfer. Further, re-polling of PHY addresses having an active CLAV status may be avoided thereby conserving resources. Other Module 620 may provide other functionality associated with optimizing CLAV status polling.

In practice, different ports may be running different speed links. For this reason, a mechanism for allowing priority to be given to higher-speed ports is provided in accordance with an embodiment of the present invention. For simplicity, the above descriptions of polling have not taken any account of this option, which is available to both transmit and receive masters. There are at least two stages to the prioritization process, according to an exemplary embodiment. First, any port may be designated as a high-speed port. This may be done by setting the appropriate "per-port" bit in a TX_PORT_SPEED register or a RX_PORT_SPEED register. Second, a poll ratio between the high and low speed ports may be determined. This may be set by a POLLRATIO field in a TX_CONTROL register and a RX_CONTROL register. Generally, there are more low-speed ports than high speed ports. A poll ratio of an embodiment of the present invention may provide prioritization for optimal performance and efficiency. For example, in an exemplary conventional system where there are four low-speed ports and one high-speed port, the high-speed port may be polled four times before all of the low speed ports have been polled.

According to another embodiment of the present invention, UTOPIA L2 CLAV status polling may be arbitrated so faster connection PHY addresses are polled proportionally more often than slower connection PHY addresses, according to one example. The speed of slave devices may be different, as communication speeds often differ. The CLAV status indication to service latency of fast PHY connections may be reduced and/or avoided, due to the CLAV status for faster connection PHY addresses being known before the last PHY address service, whether fast or slow, has finished being serviced.

As a result, less slow connection PHY addresses may be polled per cell period without increasing the polling to service latency of the slow connection PHY address. At one extreme example, the differences in connection speeds may mean a faster connection speed PHY address running at 155 MB/s which may indicate a CLAV status up to 100 times more often than a single slow connection PHY address.

Faster connection PHY addresses may be polled proportionally more often to ensure that a fast connection PHY address status may be available within one cell period. The differentiation between what is regarded as a fast connection PHY address and what is a slow connection PHY address is software configurable. According to one example, an assumption is that a 155 Mb/S link is a fast connection compared to a T1/E1 1 Mb/s –2.5 Mb/s link, which is a slow connection PHY address. Other determinations of slow and fast connections may be applied in accordance with the present invention.

The 155 Mb/s link may indicate an active CLAV status up to 100 times within the period of successive T1/E1 CLAV status. With this assumption, a UTOPIA PHY address connected to a T1/E1 link which is flagging CLAV may be left for a reasonable amount of time before congestion further back in the network will occur due to the PHYs running out of buffer space.

Figure 7:
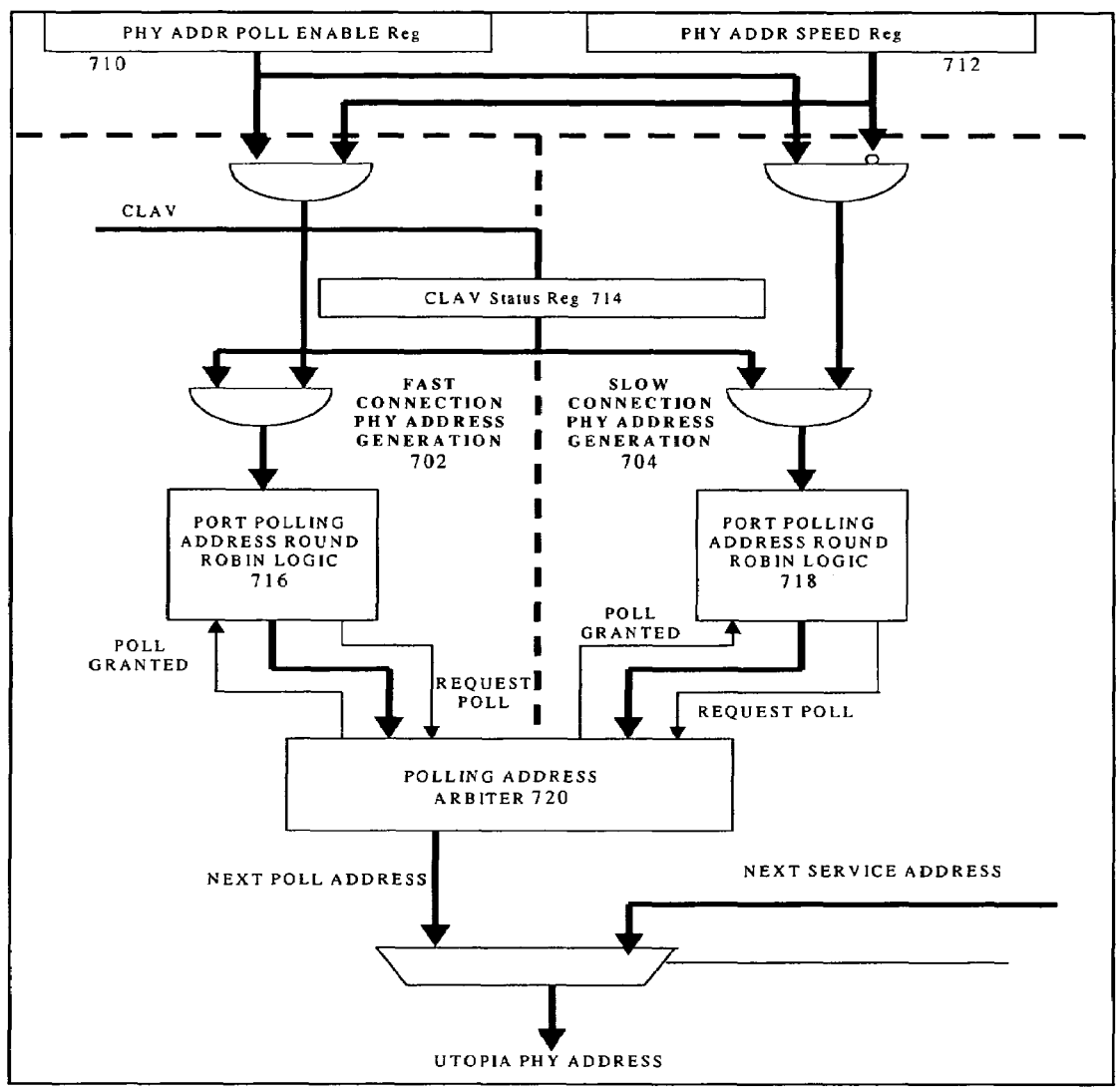
FIG. 7 is a diagram illustrating fast connection PHY address generation and slow connection PHY address generation in accordance with an embodiment of the present invention.

FIG. 7 is a diagram illustrating fast connection PHY address generation and slow connection PHY address generation in accordance with an embodiment of an embodiment of the present invention. An output from a PHY address poll enabler register 710 and an output from a PHY address speed register 712 may be received and combined with an output from a CLAV status register 714. PHY address poll enable register 710 and PHY address speed register 712 may mask the CLAV status register(s) 714 to ensure that polling is restricted to PHY addresses which are connected thereby ensuring efficient round robin checking. The combined output may be received at a port polling address round robin logic 716 for fast connections as well as a port polling address round robin logic 718 for slow connections. As shown, 702 is directed to fast connection PHY address generation and 704 is directed to slow connection PHY address generation. A polling address arbiter 720 may receive a request poll for fast connections and slow connections and respond with poll granted signals to each respective port polling address round robin logics 716, 718. A next poll address may be generated by the polling address arbiter 520, which may then be combined with a next service address for generating a UTOPIA PHY address.

A polling address arbiter of an embodiment of the present invention provides a priority polling which is dependant on a plurality of ratios, as detailed below. For example, for every four polling periods (or other predetermined number of polling periods), the ratio may arbitrate which priority input will receive a majority of the polling. The ratios may be determined by how many connections, type of connections, how the bandwidth is to be distributed and/or other additional factors and considerations. The number of ratios to be implemented as well as the value of the ratios themselves may vary in accordance with an embodiment of the present invention. The ratios described below are exemplary only.

| Value | Arbitration % Ratio (Fast/Slow) | RATIO |
|---|---|---|
| 0 | 0/100 | Only slow connection PHY addresses accepted |
| 1 | 25/75 | 1 fast connection PHY addresses serviced to every 3 slow PHY addresses |
| 2 | 50/50 | 2 fast connection PHY addresses serviced to every 2 slow PHY addresses |
| 3 | 75/25 | 3 fast connection PHY addresses serviced to every 1 slow PHY addresses |
| 4 | 100/0 | Only fast connection PHY addresses accepted |
| 5 | Reserved | Reserved |
| 6 | Reserved | Reserved |
| 7 | Reserved | Reserved |

Polling arbiter priority ratios.

The ratio of polling generally has a dramatic effect on the system performance. A critical time may include the number of PHY addresses that may be polled in the time it takes to transfer a cell; in particular, how many times a fast connection PHY address is polled.

For each cell transferred, the following arbiter results may be achieved for a 2 cycle polling.

| Arbitration Ratio (fast/slow) | Fast Connection PHY addresses polled | Slow Connection PHY addresses polled |
|---|---|---|
| 0/100 | 0 | 26 |
| 25/75 | 6-7 | 19-20 |
| 50/50 | 13 | 13 |
| 75/25 | 19-20 | 6-7 |
| 100/0 | 26 | 0 |

In the following exemplary scenarios, the following polling results may be achieved for each cell period of 53 clock cycles.

In this exemplary scenario detailed below, all 31 PHY addresses are connected and enabled with 2 clock cycle polling where the PHY address connections include 2 fast connection PHY addresses and 29 slow connection PHY addresses.

| Arbitration Ratio (fast/slow) | Result |
|---|---|
| 0/100 | 26 slow connection PHY addresses serviced ONCE |
| 25/75 | 2 fast connection PHY addresses serviced AT LEAST 3 times, 19-20 slow connection PHY addresses serviced ONCE |
| 50/50 | 2 fast connection PHY addresses serviced AT LEAST 6 times, 12 slow connection PHY addresses serviced ONCE |
| 75/25 | 2 fast connection PHY addresses serviced AT LEAST 9 times, 7 slow connection PHY addresses serviced ONCE |
| 100/0 | 2 fast connection PHY addresses serviced 13 times |

In another exemplary scenario detailed below, 14 PHY addresses are enabled and connected, with 2 clock cycle polling where the PHY address connections include 2 fast connection PHY addresses and 12 slow connection PHY addresses.

| Arbitration Ratio (fast/slow) | Result |
|---|---|
| 0/100 | 12 slow connection PHY addresses serviced AT LEAST TWICE |
| 25/75 | 2 fast connection PHY addresses serviced AT LEAST 3 times, 12 slow connection PHY addresses serviced AT LEAST ONCE |
| 50/50 | 2 fast connection PHY addresses serviced AT LEAST 6 times, 12 slow connection PHY addresses serviced AT LEAST ONCE |
| 75/25 | 2 fast connection PHY addresses serviced AT LEAST 9 times, 6-7 slow connection PHY addresses serviced ONCE |
| 100/0 | 2 fast connection PHY addresses serviced 13 times |

In yet another exemplary scenario detailed below, 8 PHY addresses are enabled and connected, with 2 clock cycle polling where the PHY address connections include 8 fast connection PHY addresses and no slow connection PHY addresses.

| Arbitration Ratio (high/low) | Result |
| --- | --- |
| 0/100 | NO PHY ADDRESSES POLLED as no PHY addresses present |
| 25/75 | 6-7 fast connection PHY addresses serviced ONCE, NO slow connection PHY addresses serviced ONCE |
| 50/50 | 8 fast connection PHY addresses serviced AT LEAST ONCE, NO slow connection PHY addresses serviced ONCE |
| 75/25 | 8 fast connection PHY addresses serviced AT LEAST TWICE, NO slow connection PHY addresses serviced ONCE |
| 100/0 | 8 fast connection PHY addresses serviced AT LEAST 3 times |

Figure 8:
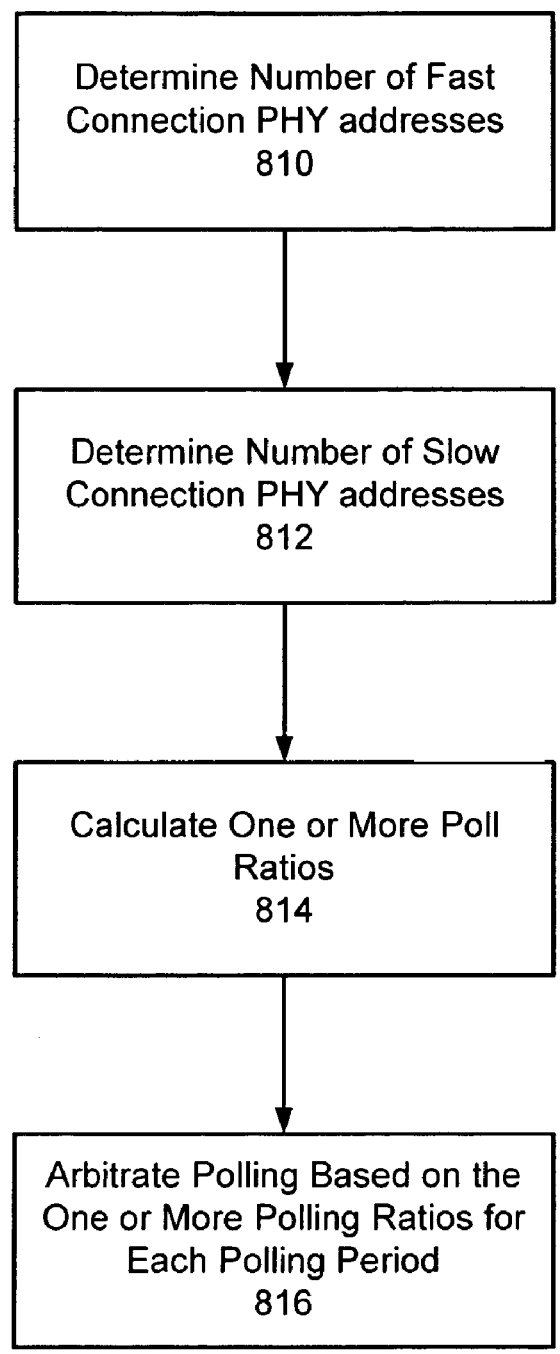
FIG. 8 is an exemplary flowchart illustrating a method for prioritizing status polling, in accordance with an embodiment of the present invention.

FIG. 8 is an exemplary flowchart illustrating a method for prioritizing status polling, in accordance with an embodiment of the present invention. At step 810, a number of fast connection PHY addresses may be determined. At step 812, a number of slow connection PHY addresses may be determined. At step 814, a poll ratio based on the number of fast connection PHY addresses and the number of slow connection PHY addresses may be calculated. At step 816, status polling may be arbitrated based at least in part on the poll ratio for at least one polling period. The fast connection PHY addresses and/or the slow connection PHY addresses may be software configurable. The poll ration may include a plurality of poll ratios. Further, status polling may be arbitrated at a different poll ratio for each polling period. Exemplary poll ratios may include 0/100, 25/75, 50/50, 75/25, 100/0 where each poll ratio represents fast connections to slow connections.

Figure 9:
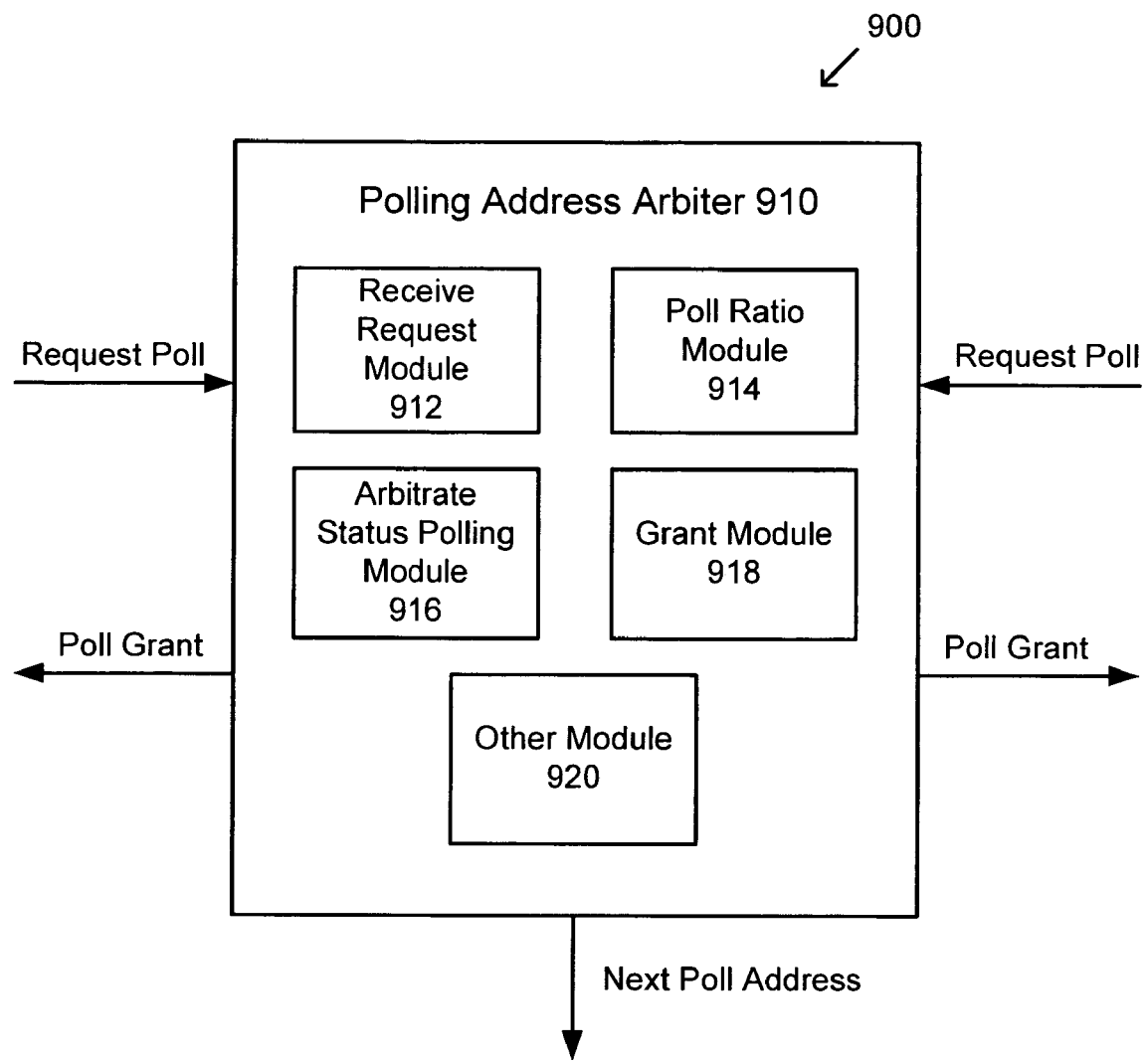
FIG. 9 is an exemplary diagram illustrating a system for prioritizing status polling, in accordance with an embodiment of the present invention.

FIG. 9 is an exemplary diagram illustrating a system for prioritizing status polling, in accordance with an embodiment of the present invention. A system 900 for prioritizing status polling based on connection speed may include a Polling Address Arbiter 910. Polling Address Arbiter 910 may include a Receive Request Module 912, a Poll Ratio Module 914, an Arbitrate Status Polling Module 916, a Grant Module 918, and Other Module 920. Receive Request Module 912 may receive one or more request poll signals. Poll Ratio Module 914 may calculate a poll ratio based on the number of fast connection PHY addresses and the number of slow connection PHY addresses. Arbitrate Status Polling Module 916 may arbitrate status polling based at least in part on the poll ratio for at least one polling period. Grant Module 918 may generate one or more poll grant signals. Further, a next poll address may be forwarded. Other Module 929 may provide other functionality associated with prioritizing status polling.

When combining the inventive concepts discussed above, the CLAV polling bandwidth may be optimised further. In particular, if a connection speed no longer has any PHY addresses which require polling, the arbitration may be altered so only the connection speed with PHY addresses which require polling are actually polled. This ensures that the polling bandwidth is used as efficiently as possible. In addition, for multiple CLAV status polling, polling a PHY address may be stopped or avoided if all CLAV statuses for that PHY address have indicated an active CLAV status and have yet to be serviced. Further, the polling bandwidth may be maximized when used along with polling arbitration.

The UTOPIA device within the GlobespanVirata® Corporation's Helium™ 500 chip, as described in detail below, may poll 31 PHY addresses using a method specified by the ATM forum UTOPIA L2 specification af-phy-0039.000 with the enhancements of various embodiments of the present invention. According to an embodiment of the present invention, a single CLAV status polling method may consider connection speed, whether an active CLAV status has been indicated, and whether a PHY address has or has not been serviced. For each connection speed, each PHY address which has not indicated an active CLAV status may be polled in turn, starting at address 0x00 through to address 0x1E, for example. A Null PHY address 0x1F may be polled between each polled PHY address to allow the PHY to respond. A polling arbiter may then decide which connection speed the PHY address is to be polled next.

Figure 10:
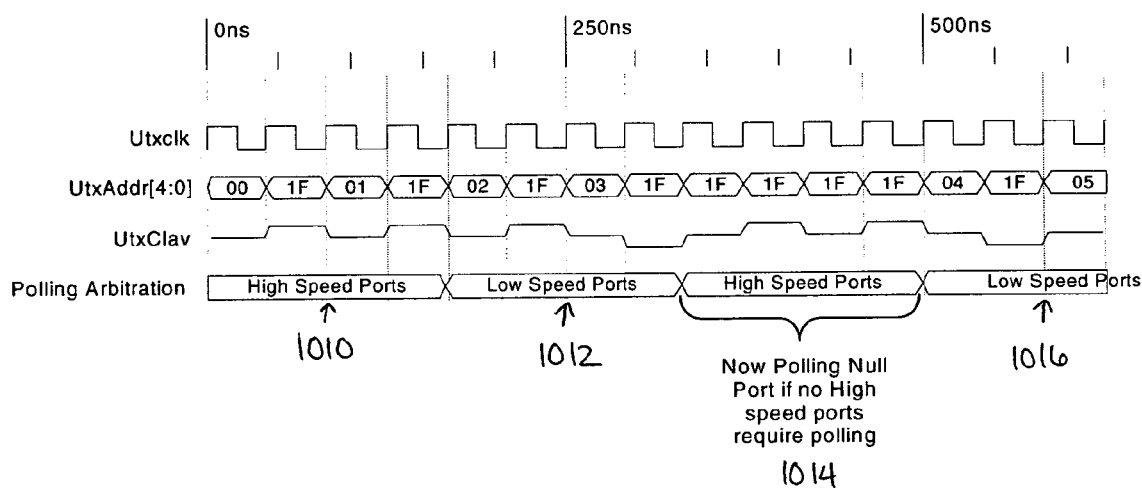
FIG. 10 illustrates a basic polling arbitration (50/50 ratio) in accordance with an embodiment of the present invention.

If fast and slow speed connections are being used, the polling arbiter may be set at a polling ratio of 25/75, 50/50 or 75/25, for example. Other ratios may be implemented in accordance with embodiments of the present invention. The number of poll ratios may vary as well. According to an embodiment of the present invention, PHY addresses are not polled again once a PHY address has indicated an active CLAV status until the PHY address has been serviced. If all PHY addresses on one connection speed have indicated an active CLAV status and have not been serviced yet, then the polling cycles for that connection speed are wasted, as illustrated in FIG. 10. FIG. 10 illustrates a basic polling arbitration (50/50 ratio). As shown, a first set of high speed ports 1010 are polled, then a first set of low speed ports 1012. At the second set of high speed ports 1014, only null ports (e.g., 1F) are being polled since there are no high speed ports requiring polling. A second set of low speed ports 1016 are polled, in accordance with the polling ratio.

Figure 11:
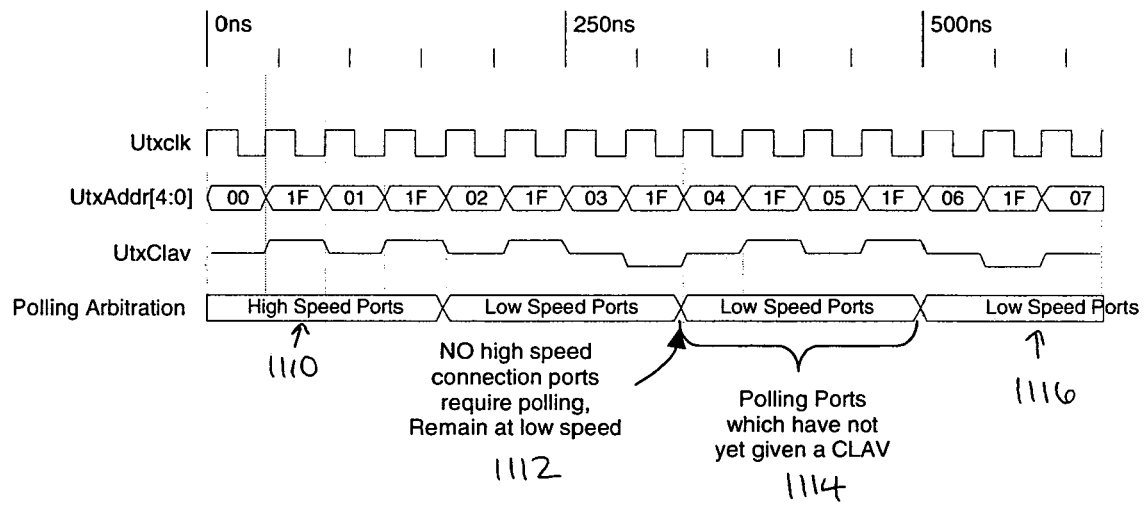
FIG. 11 illustrates an enhanced polling arbitration (50/50 ratio) in accordance with an embodiment of the present invention.

Polling bandwidth may be used more efficiently by switching the arbitration to one connection speed until the other connection speed indicates PHY addresses have been serviced (e.g., a PHY address requires polled again), as illustrated in FIG. 11. FIG. 11 illustrates an enhanced polling arbitration (50/50 ratio) in accordance with an embodiment of the present invention. As shown, a first set of high speed ports 1110 are polled, then a first set of low speed ports 1112 are polled. Since there are no high speed connection ports that require polling, a second set of low speed ports 1114 may be polled. Further, additional low speed ports 1116 may be continued to be polled. Thus, ports (e.g., low speed ports) that have not yet given a CLAV status are polled.

If all PHY addresses on both connection speeds have indicated a CLAV status and no PHY address has yet been serviced, then the polling may revert to polling the default PHY address of 0x1F (or other default address).

According to an embodiment of the present invention, multiple CLAV status polling may check multiple PHY's CLAV statuses for each of the 31 PHY addresses. A PHY address may be skipped from the polling procedure if all of its CLAV statuses are flagging an active CLAV. Once one of those CLAV statuses for that PHY address is serviced then all the CLAV statuses for that PHY address may be polled again since at least one status is unknown.

Figure 12:
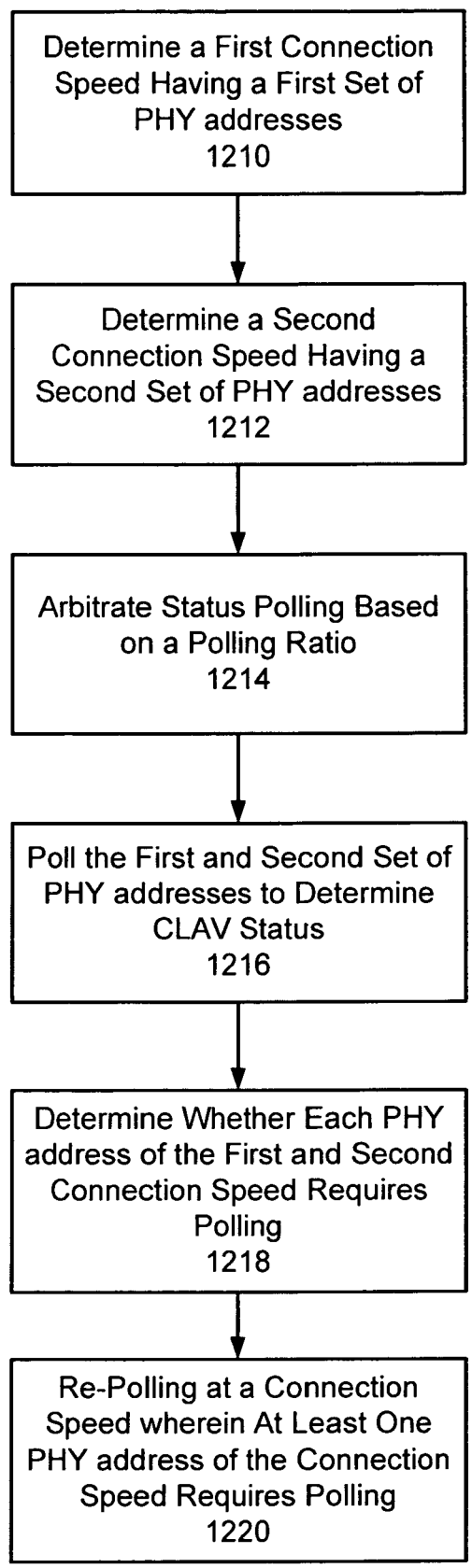
FIG. 12 is an exemplary flowchart illustrating a method for optimizing CLAV status polling, in accordance with an embodiment of the present invention.

FIG. 12 is an exemplary flowchart illustrating a method for optimizing CLAV status polling, in accordance with an embodiment of the present invention. At step 1210, a first connection speed having a first associated set of PHY addresses may be determined. At step 1212, a second connection speed having a second associated set of PHY addresses may be determined. At step 1214, status polling may be arbitrated based at least in part on a polling ratio involving the first connection speed and the second connection speed. At step 1216, the first and second associated set of PHY addresses may be polled to determine a CLAV status for each PHY address, according to the polling ratio. At step 1218, whether each PHY address of the first and second connection speed requires polling may be determined. Step 1220 may involve re-polling at a connection speed wherein at least one PHY address of the connection speed requires polling. The polling ratio may be based on a number of PHY addresses of the first connection speed and a number of PHY addresses of the second connection speed. Further, the polling ratio may be updated based on a number of PHY addresses requiring polling.

Figure 13:
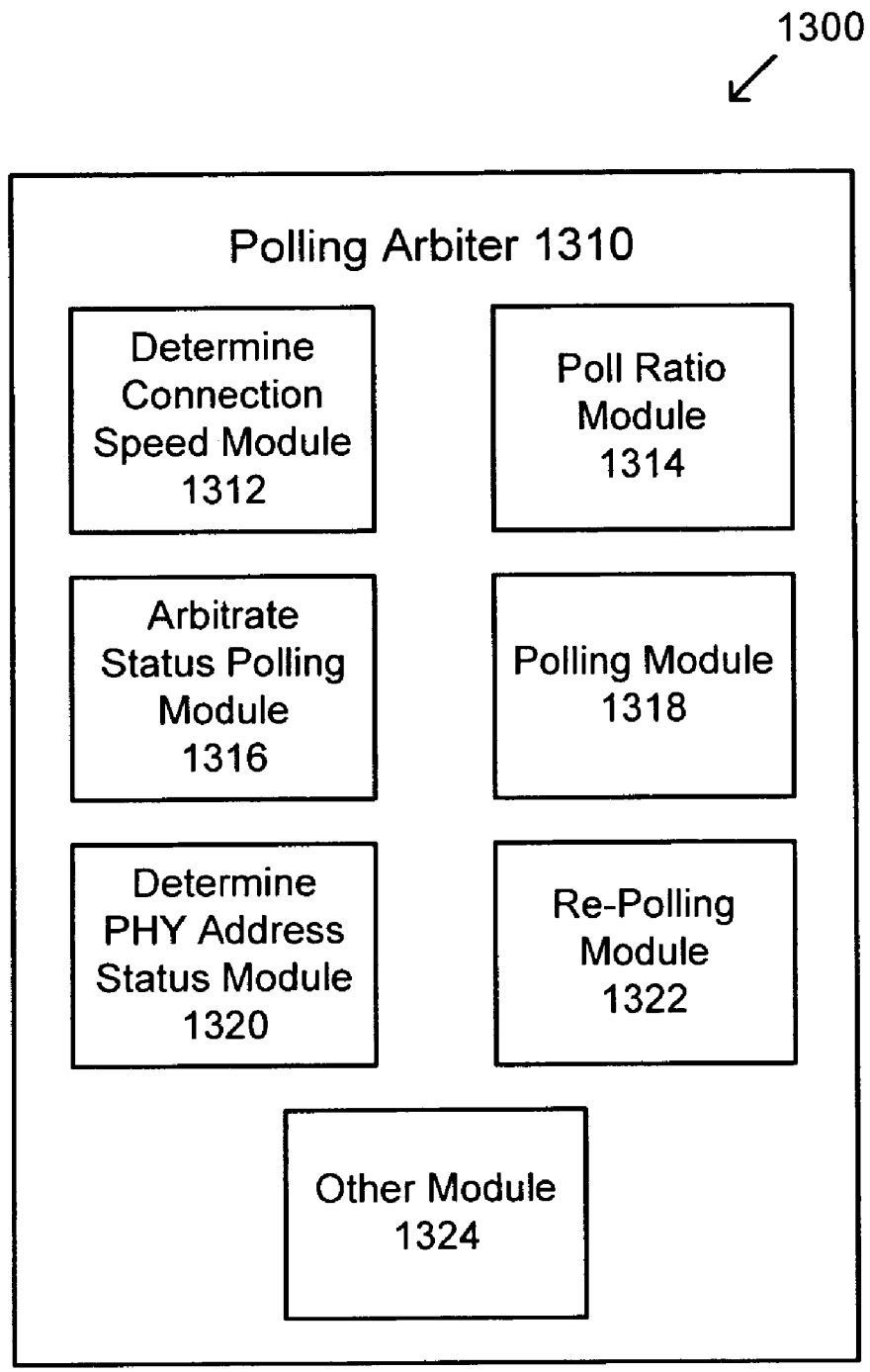
FIG. 13 is an exemplary diagram illustrating a system for optimizing CLAV status polling, in accordance with an embodiment of the present invention.

FIG. 13 is an exemplary diagram illustrating a system for optimizing CLAV status polling, in accordance with an embodiment of the present invention. A system 1300 may include a polling arbiter 1310 for optimizing cell available (CLAV) status polling. The Polling arbiter 1310 may include a Determine Connection Speed Module 1312, a Poll Ratio Module 1314, an Arbitrate Status Polling Module 1316, a Polling Module 1318, a Determine PHY Address Status Module 1320, a Re-Polling Module 1322, and Other Module 1324. Determine Connection Speed Module 1312 may determine a first connection speed having a first associated set of PHY addresses and a second connection speed having a second associated set of PHY addresses. Poll Ratio Module 1314 may calculate a poll ratio involving the first connection speed and the second connection speed. Arbitrate Status Polling Module 1316 may arbitrate status polling based at least in part on a polling ratio. Polling Module 1318 may poll the first and second associated set of PHY addresses to determine a CLAV status for each PHY address, according to the polling ratio. Determine PHY Address Status Module 1320 may determine whether each PHY address of the first and second connection speed requires polling. Re-Polling Module 1322 may re-poll at a connection speed wherein at least one PHY address of the connection speed requires polling. Other Module 1324 may provide other functionality associated with optimizing CLAV status polling.

GlobespanVirata® Corporation's Helium™ 500 communications processor (Helium 500 CP) is a high performance ATM and Internet Protocol (IP) processor. Helium 500 CP offers an extended range of I/O options and features, providing great flexibility as well as an extended choice of operating systems for an application developer. Helium 500 CP uses a dual processor architecture to provide an efficient and flexible solution for a range of applications. The main CPU, the Protocol Processor (PP), runs the operating system and application software. Time critical tasks, such as servicing of I/O ports, ATM switching and ATM traffic shaping are handled by a second processor, the Network Processor (NP). This dual processor design frees the main CPU from constant interrupts, enabling very efficient use of the processor and memory bandwidth for application processing tasks. The Network Processor itself is made more efficient by the inclusion of independent Direct Memory Access (DMA) controller blocks in each of the high-performance VO blocks. Use of these reduces the NP processing to the start and end of a packet only.

Figure 14:
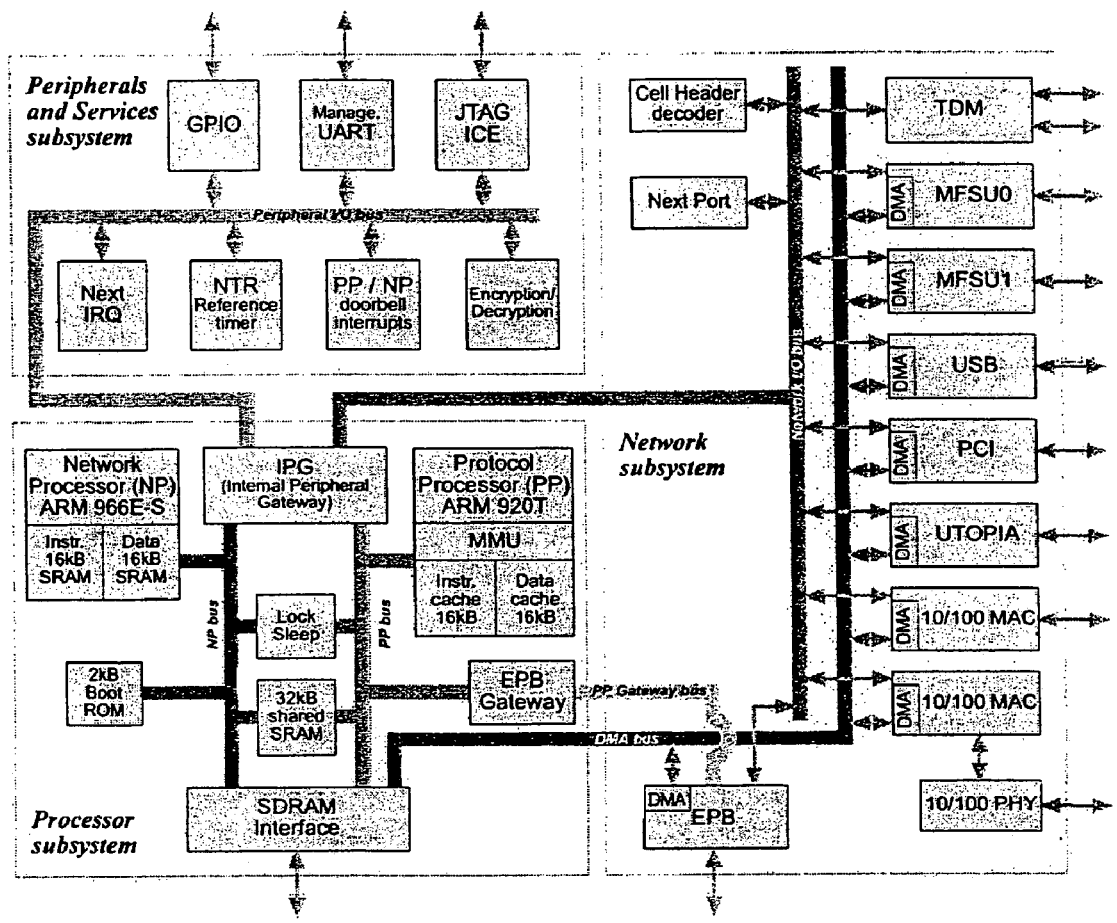
FIG. 14 is a schematic diagram of a hardware architecture in which the inventive aspects of the present invention may be incorporated.

FIG. 14 is a schematic diagram of a hardware architecture in which the inventive aspects of the present invention may be incorporated. In particular, FIG. 14 illustrates a block diagram of Helium 500 CP incorporating the inventive aspects discussed above, in accordance with the present invention. The Helium 500 CP has at least three functional subsystems, which include a Processor subsystem, a Network subsystem and a Peripherals and Services subsystem. The Processor subsystem comprises a dual Advanced Reduced Instruction Set Computing (RISC) Machine (ARM®) processor, shared memory and a common Static Random Access Memory (SRAM) interface block. The Network subsystem provides high performance I/O connections and associated services. The Peripherals and Services subsystem provides a programmable General Purpose I/O (GPIO) connection, management and debug connections and additional services for the processors, including hardware encryption/decryption block for optimal network performance. This block also includes the system clocks and timers. These functional sub-systems are linked by high-performance buses, all of which operate at the same clock speed as the processors.

For its main CPU, the Helium 500 CP uses the powerful ARM920T® processor running at 166 or 133 MHz, depending on product variant. Large data and instruction caches and a highly efficient Synchronous Dynamic Random Access Memory (SDRAM) controller further enhance performance. In addition, the inclusion of a memory management unit (MMU) allows the use of a wider choice of operating systems for application development. Applications for the Helium 500 CP can be developed using any of the ATMOS™ operating system, from GlobespanVirata® Corporation; VxWorks™, from Wind River™, Linux™ and others. For its second processor, the Helium 500 CP uses the high-performance ARM966E-S® processor, also running at 166 or 133 MHz, depending on product variant. For maximum data transfer efficiency, the NP shares SRAM and the SDRAM controller with the PP.

The Helium 500 CP incorporates a wide range of I/O blocks, making it an ideal platform for applications requiring cell, frame and Time Division Multiplexing (TDM) connectivity. In addition to its on-board I/O capabilities, the Helium 500 CP provides expansion ports dedicated to state-of-the-art peripheral devices. Its External Peripheral Bus (EPB) supports Motorola™ or Intel™-type peripheral devices, as well as Personal Computer Memory Card International Association (PCMCIA) peripheral devices. For very high performance peripherals, the Helium 500 CP includes a Peripheral Component Interconnect (PCI) expansion bus and system controller. The PCI bus has a direct path to system memory, allowing peripherals to DMA data directly.

Each of the Network I/O blocks, except for the TDM block, includes a dedicated DMA engine. These share a dedicated DMA bus, through which they connect directly to the SDRAM controller. The DMA system allows data transfers between the I/O blocks and external SDRAM to be performed with minimal intervention from the processors.

The Helium 500 communications processor has the following key features: choice of operating system support from ATMOS® from GlobespanVirata® Corporation, VxWorkS™ from Wind River™; and Linux™; Protocol Processor (PP) as the main CPU: High-performance ARM® 9 with MMU, 16 KB data cache, 16 KB instruction cache; separate ARM® 9 Network Processor (NP) off-loads time-critical tasks from PP, 32 KB private "tightly coupled" SRAM onchip: 16 KB data, 16 KB instruction space; product variants with 166 MHz and 133 MHz processor speeds, memory systems designed to optimize throughput of data: additional 32 KB SRAM shared between the two processors, high performance SDRAM controller, shared by the two processors, operates synchronously with processors; supports up to 128 MB external DRAM; high-performance DMA systems, optimized for efficient handling of communications data: each high-bandwidth I/O block has its own dedicated DMA engine, a common full-speed 32 bit bus links the DMA engines directly to the SDRAM controller; in normal operation, the NP will initiate a DMA transfer where no further NP processing is required until the transfer has completed, functions such as checksum calculation and byte alignment can be performed while the data is being transferred, Nextport logic block determines which I/O port service request has the highest priority, removing need for any polling of I/O ports by the processor, similarly, a Next Interrupt Request (IRQ) block prioritizes outstanding IRQs without processor intervention; dual 10/100 Mb/s Ethernet Media Access Controllers (MACs); Encryption/Decryption hardware accelerator (with Internet Protocol Security (IPSec) support), supported by hardware random number generator: encrypts and decrypts data as defined in FIBS BUS 81, single or triple Data Encryption Standard (DES) modes; supports Electronic Code Book (ECB), Cipher Block Chaining (CBC), Output Feedback (cryptography) (OFB)-64, incorporates Secure Hashing Algorithm according to FIPS PUB 180-1 (SHA-1) hardware assist function; two high-speed multi-function serial units (MFSUs), each of which is configured to operate in one of three modes: High-Level Data Link Control (HDLC) mode conforms to q.921 and ISO/IEC 2209:1993, supports bus mode, V.35 and X.21 fixed links operating at up to 50 Mb/s, hardware support for 16 and 32 bit Frame Checking Sequence (FCS); I.432 Mode is in accordance with International Telecommunication Union-Telecommunications (ITU-T) I.432 interface standard at 50 Mb/s data rate; High-speed Serial Universal Asynchronous Receiver and Transmitter (UART) mode, supporting both 3-wire and 5-wire interfaces (software or hardware flow control) at 1.5 Mb/s data rate, suitable for connection to Bluetooth devices; TDM block provides two independent TDM interfaces with flexible HDLC controllers, each offering data rate up to 8 Mb/s; up to 256 programmable time-slots, up to 32 simultaneous HDLC streams, with single or multiple time-slots and programmable number of bits per slot; ability to support "quad" framer devices (carrying up to four Ti/El channels); UTOPIA master/slave port offers UTOPIA level 1 or 2 ports, master or slave operation, provides up to 31 ports, first 8 ports can be configured for high-speed operation; Network Timing Reference (NTR) recovery function, can also provide local network clock generation; PCI expansion bus for high-speed, flexible peripheral connection: 32 bit, 33 MHz bus, PCI master or slave operation, in-built arbiter with support for up to two peripheral devices for operation in master mode, PCI Rev 2.2 complaint; External peripheral bus (EPB) for co-processor or peripheral expansion: supports 8, 16 and 32 bit bus widths, offers support for i960, Motorola, Intel and PCMCIA bus formats, programmable strobes allows support for other formats; Universal Serial Bus (USB) 1.1 slave port operates at 12 Mhz; Programmable GPIO block with up to 64 I/O pins available, each configurable as input or output, allows interfacing to local device (e.g., for driving indicators or sensing switches); support for IEEE 1149.1 boundary scan and ARM® In-Circuit Emulator (ICE) debugger; Compatible with GlobespanVirata Corporation Helium family of products and IP Service Operating System (ISOS) software; designed throughout for low-power operation, many operational blocks can be put into standby mode to save power.

Figure 15:
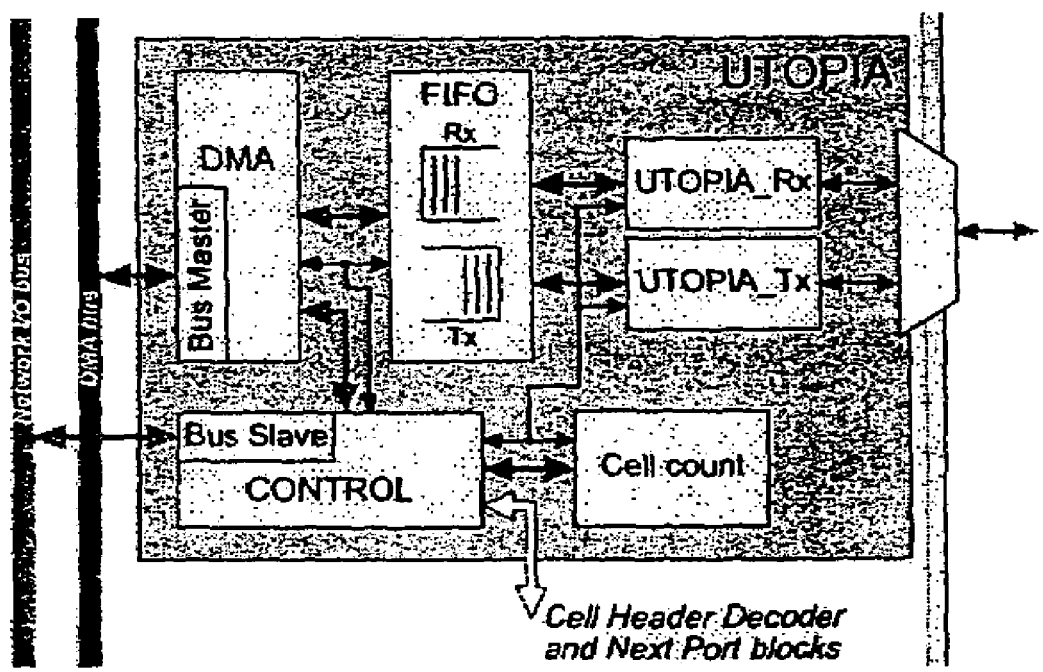
FIG. 15 is a schematic diagram of a hardware architecture in which the inventive aspects of the present invention may be incorporated.

FIG. 15 is a schematic diagram of a hardware architecture in which the inventive aspects of the present invention may be incorporated. In particular, FIG. 15 is a UTOPIA block functional overview incorporating the inventive features discussed in detail above. The Helium 500 CP provides a single UTOPIA interface which can operate in the following four modes: UTOPIA level 2 Master (L2M) up to 31 ports; UTOPIA Level 2 Slave (L2S) single port (port number between 0 and 30); UTOPIA Level 1 Master (L1M) single port (port 0); and UTOPIA level 1 slave (L1S) single port (port 0).

As shown in FIG. 15, the main data path through the block passes (in the reverse direction) from the external connections, through the UTOPIA Rx processor, to the First In First Out (FIFO) block. The DMA engine, which forms part of the block, transfers data from the FIFO onto the DMA bus and then directly into SDRAM. The transmit data path is simply the reverse of this, passing from the FIFOs through the UTOPIA Tx processor block. In addition, the UTOPIA block control logic is connected to the Network I/O bus, and can also access the FIFOs. A cell counter unit is also provided; this tracks the number of cells transmitted and received on each port. The block provides highly-flexible support for the prioritization of some ports for high-speed operation. Separate FIFOs are provided for Transmit and Receive data. The organization of the FIFOs depends on the operating mode of the block; however each active port is always provided with at least a single cell (e.g., 13-word) buffer. The FIFO hardware provides synchronization between the different clock domains of the UTOPIA block, where this is required.

Figure 16:
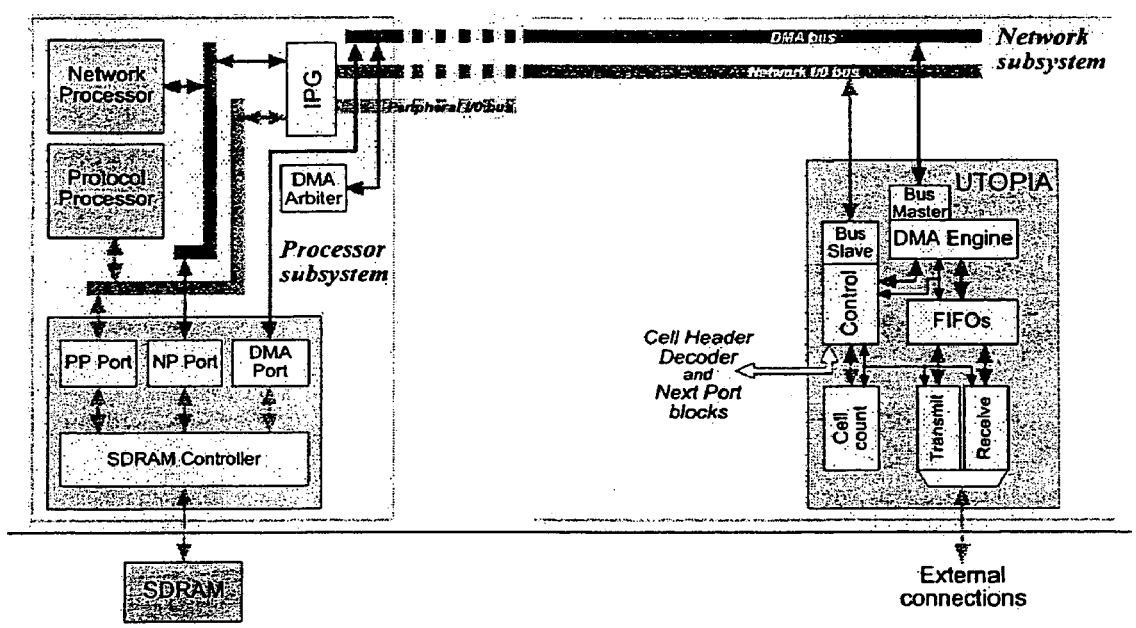
FIG. 16 is a schematic diagram of a hardware architecture in which the inventive aspects of the present invention may be incorporated.

FIG. 16 is a schematic diagram of a hardware architecture in which the inventive aspects of the present invention may be incorporated. In particular, FIG. 16 illustrates the relation of the UTOPIA block to the Helium 500 CP architecture. This diagram indicates how the UTOPIA block's DMA engine transfers data directly to external SDRAM, via the DMA bus and the SDRAM controller, without any intervention from the processors. It also indicates the direct connections between the UTOPIA block and the Next Port and Cell Header Decoder blocks of the Network subsystem.

Figure 17:
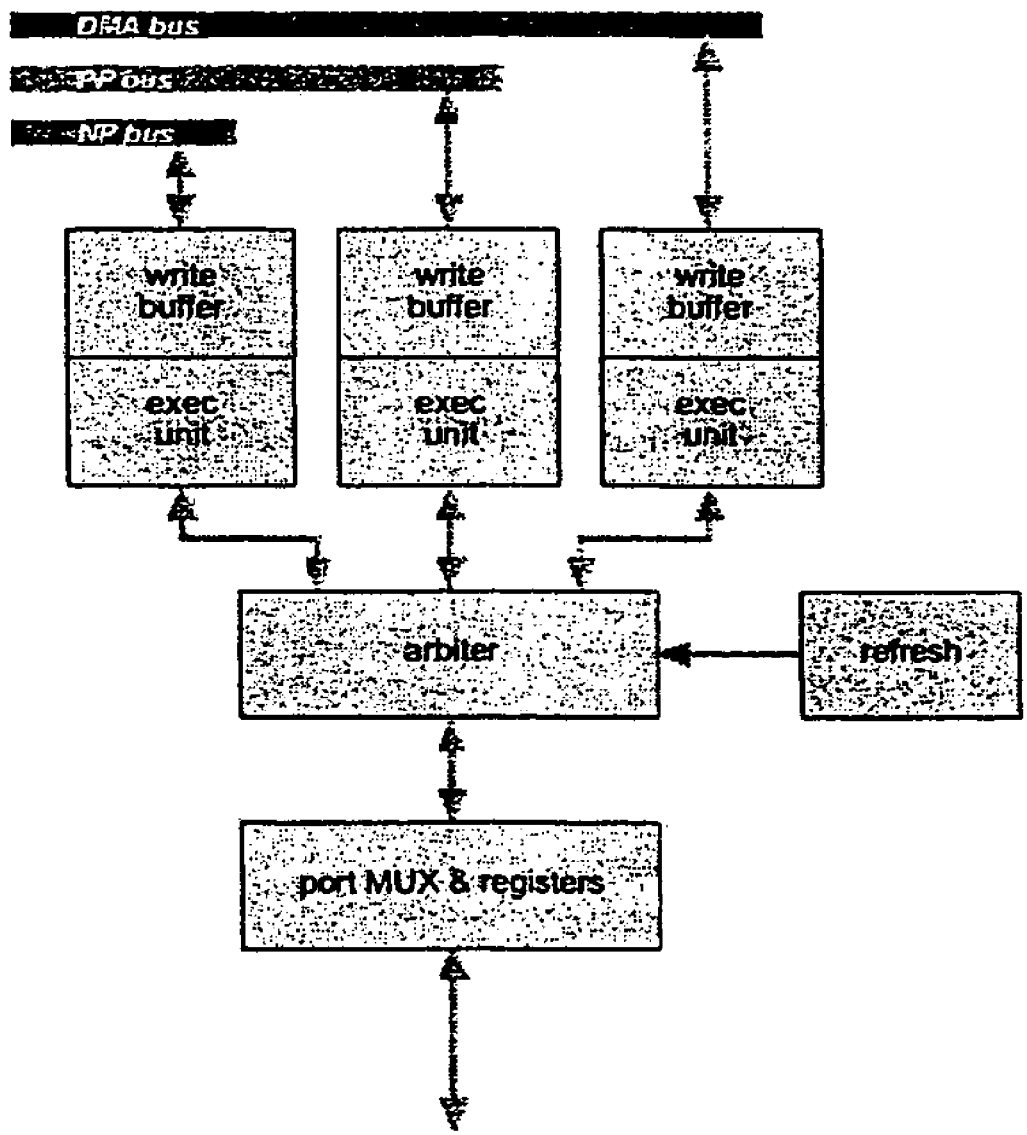
FIG. 17 is a schematic diagram of a hardware architecture in which the inventive aspects of the present invention may be incorporated.

FIG. 17 is a schematic diagram of a hardware architecture in which the inventive aspects of the present invention may be incorporated. In particular, FIG. 17 illustrates a SDRAM block diagram. The SDRAM controller provides a high-performance interface to external SDRAMs for code and data storage. It operates at the processor core clock frequency of 166 or 133 MHz, and is compatible with the Joint Electronic Device Engineering Counsel (JEDEC) standard JED2421 for interfacing to synchronous DRAMs. The controller has three internal ports allowing the DMA controller, the NP and the PP to access SDRAM via separate internal buses. The controller features independent write data and address buffering on each port (e.g., 16 word data buffer on each port (DMA, NP and PP ports); 1 address buffer per port); intelligent arbitration between the three ports where the arbitration scheme dynamically adjusts to the load conditions and also guarantees maximum latency requirements at each port; and advanced SDRAM interleaving where the SDRAM controller re-orders memory cycles to optimize data transfer. It does this by automatically interleaving banks of memory with in the SDRAM devices. The overhead of preparing one bank is hidden during data movement to the other. This process is entirely transparent to the user. Other features include data coherency guarantee where the controller guarantees data coherency between ports (e.g., data in a write buffer on one port can be accessed by a read from another port) and support for memory devices sizes of 64 Mb, 128 Mb and 256 Mb, each of which can be 8, 16 or 32 bits wide, the maximum memory that can be connected is 4×256 Mb (128 MB). Generally, access to the external SDRAM is 32-bits wide. Another feature includes a power down mode where a low power mode drastically reduces the power consumed by external SDRAM devices.

Figure 18:
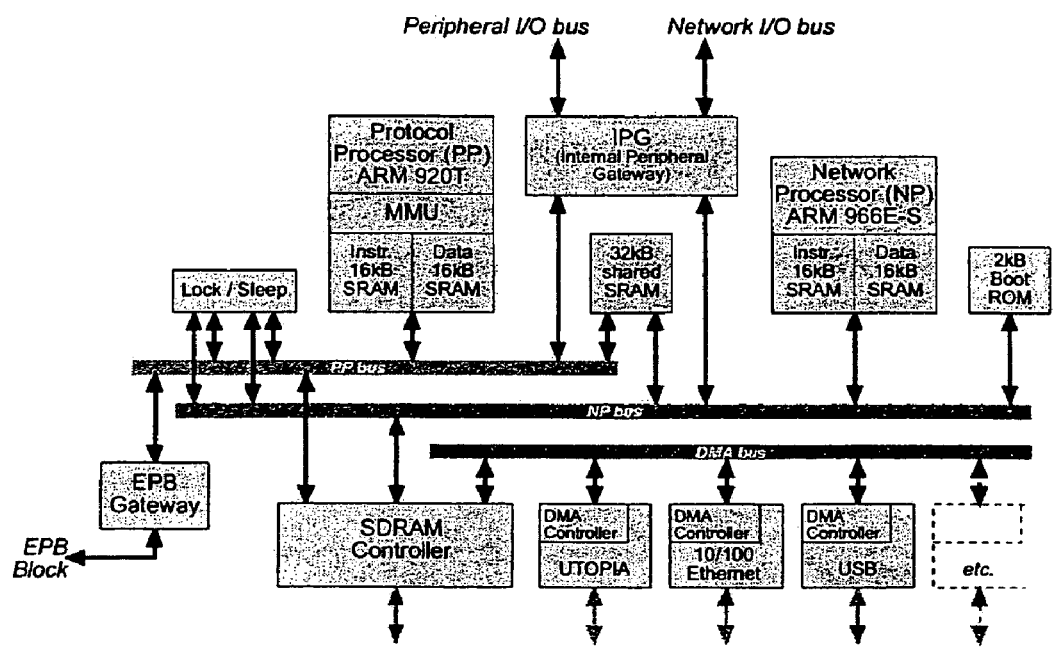
FIG. 18 is a schematic diagram of a hardware architecture in which the inventive aspects of the present invention may be incorporated.

FIG. 18 is a schematic diagram of a hardware architecture in which the inventive aspects of the present invention may be incorporated. In particular, FIG. 18 illustrates a core system including processors and DMAs. A principle use of the DMA system is for the NP to transfer data packets and cells between SDRAM buffers and network ports. The DMA system may include a DMA engine within each of the high performance I/O blocks and a dedicated DMA bus linking these engines to the SDRAM controller. This enables the NP to interleave operations efficiently on different devices without being stalled by SDRAM accesses. The DMA channels carry out functions such as checksum calculation and byte alignment as the data is transferred. The PP may also make use of DMA channels, for example to access devices attached to the EFB.

Figure 19:
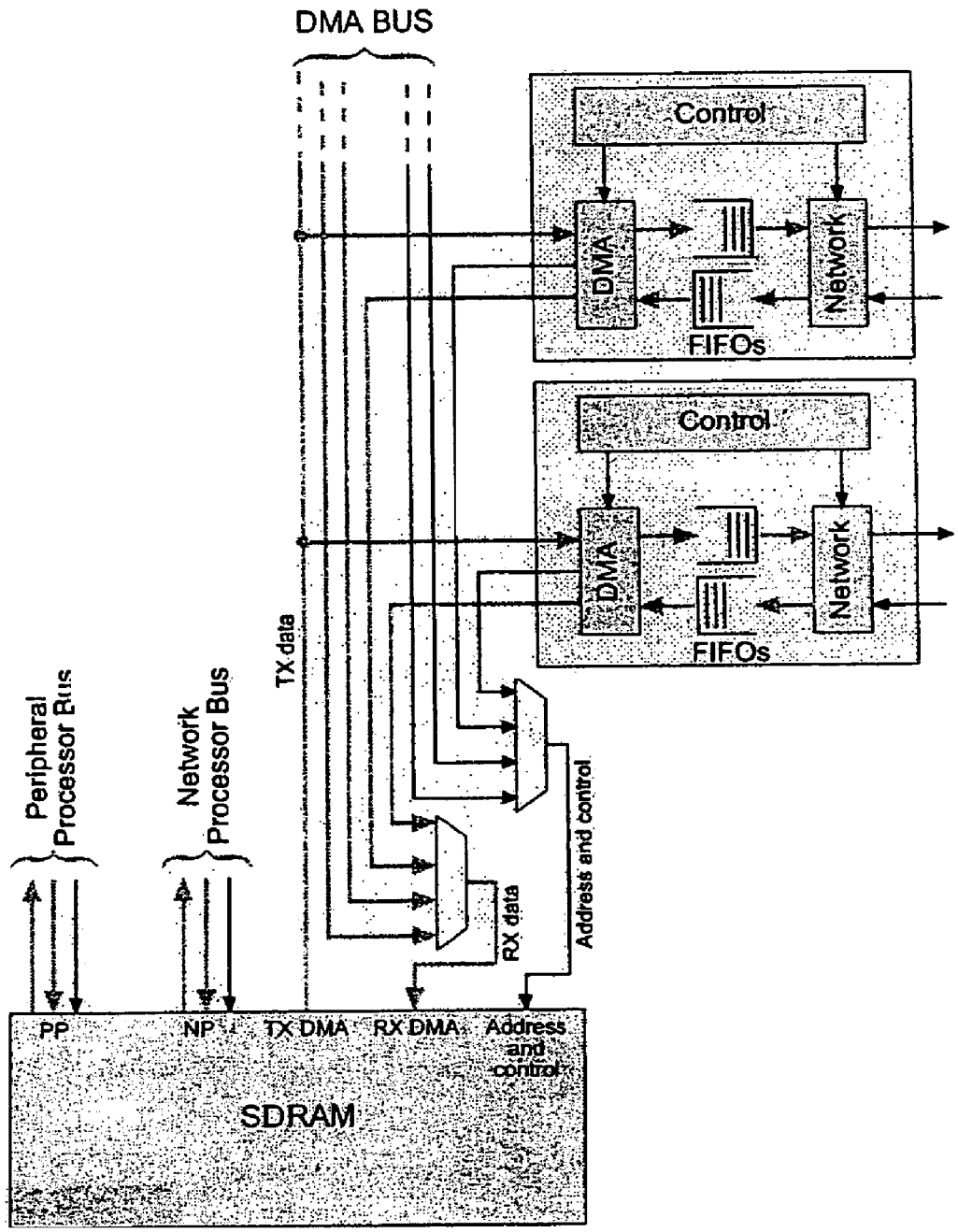
FIG. 19 is a schematic diagram of a hardware architecture in which the inventive aspects of the present invention may be incorporated.

FIG. 19 is a schematic diagram of a hardware architecture in which the inventive aspects of the present invention may be incorporated. In particular, FIG. 19 is a DMA block diagram. The DMA system reduces the reliance on NP when transferring data between high-speed I/O modules and the SDRAM memory. The system includes a DMA controller within each of the high-speed I/O modules, connecting directly to the Transmit and Receive FIFOs within the module; a dedicated DMA port on the SDRAM controller; and a dedicated high-speed 32-bit DMA bus, linking the DMA controllers to the SDRAM controller. DMA transfers between the network module FIFOs and the SDRAM take place in parallel with other NP operations; NP processing is required only at the start and end of the packet or cell. Each DMA controller is able to discard packets that do not need to be received. A single DMA transfer across the bus (e.g., a burst) is between one and 16 words. The 16 word limit prevents any device from "hogging" the DMA bus. Where larger DMA data transfers are required they are split into multiple 16-word bursts, automatically. Write performance is enhanced by buffering in the SDRAM controller. The addressable memory range of the DMA controllers is 256 MB, although the SDRAM controller limits the usable address range of 128 MB.

The DMA system illustrated in FIG. 19 includes two exemplary I/O blocks. Additional I/O blocks may be implemented. The control block without each of the I/O blocks is connected to the Network I/O. For clarify, these connections have been omitted from the diagram. The SDRAM controller shown in FIG. 19 provides write buffering on its input from the DMA bus, optimizing the performance of write operations.

Data transfers within the Helium 500 CP will normally take place under the control of the Network Processor (NP), responding to service requests provided through the Next Port mechanism. The Helium 500 CP allows other modes of operation; for example, DMA transfers could be driven by interrupts from the I/O ports. DMA transfers involve the inter-operation of the I/O block and the DMA block. Each I/O block which uses the DMA engine has two groups of registers, the I/O block-specific registers and the DMA registers. The I/O block-specific registers control data transfers (e.g., transmission and reception) between the I/O block and the external network and may be highly block specific. The DMA registers control DMA data transfer between the I/O block and the SDRAM and are essentially the same for each block, although not all of the DMA registers are provided in all I/O blocks. To set up a network data transfer (e.g., transmit or receive), I/O block-specific registers will be used to set up the transmit or receive operations and the DMA registers will be used to set up the data transfer between the I/O block and the SDRAM. Data is transferred directly between SDRAM and the FIFOs of the I/O block, under the control of the DMA engine and without any intervention from the NP. Burst transfers across the DMA bus are limited to a maximum of 16 words; if the requested transfer is longer than this it will be split into multiple 16-word bus transfers, and DMA bus arbitration will take place after each burst. With transmit operations, signaling within the DMA system ensures that data is only transferred across the DMA bus if the FIFO has space to receive it. The I/O block is responsible for detecting the recovering from data over- or under- run conditions, and may abort the DMA transfer (e.g., if it is unable to transmit data from the FIFO to free up space for the requested data transfer). When the entire data transfer has been completed the DMA block raises a service request to indicate the fact. The I/O block may then need to perform additional processing to complete the operation.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for optimizing cell available (CLAV) status polling, the method comprising the steps of:
   determining a first connection speed having a first associated set of PHY addresses and a second connection speed having a second associated set of PHY addresses;
   arbitrating status polling based at least in part on a polling ratio involving the first connection speed and the second connection speed;

polling the first and second associated set of PHY addresses to determine a CLAV status for each PHY address, according to the polling ratio;

determining whether each PHY address of the first and second connection speed requires polling; and re-polling at a connection speed wherein at least one PHY address of the connection speed requires polling.

2. The method of claim 1, wherein the polling ratio is based on a number of PHY addresses of the first connection speed and a number of PHY addresses of the second connection speed.

3. The method of claim 1, further comprising the step of: updating the polling ratio based on a number of PHY addresses of the first connection speed that require polling and a number of PHY addresses of the second connection speed that require polling.

4. The method of claim 1, wherein the step of determining whether each PHY address requires polling further comprises the step of: determining whether the CLAV status is an active CLAV status.

5. The method of claim 4, further comprising the step of determining whether the PHY address with an active CLAV status has been serviced.

6. The method of claim 1, wherein PHY addresses with an active CLAV status that have not been serviced are not re-polled wherein bandwidth is conserved.

7. The method of claim 1, wherein the polling ratio comprises a plurality of polling ratios.

8. The method of claim 7, wherein the poll ratios include 0/100, 25/75, 50/50, 75/25, 100/0 wherein each poll ratio represents the first connection speed to the second connection speed.

9. The method of claim 1, wherein one or both of the first connection speed and the second connection speed are software configurable.

10. The method of claim 1, wherein the first connection speed is a fast connection speed and the second connection speed is a slow connection speed.

11. A system for optimizing cell available (CLAV) status polling, the system comprising:

a determining connection speed module for determining a first connection speed having a first associated set of PHY addresses and a second connection speed having a second associated set of PHY addresses;

an arbitrating status polling module for arbitrating status polling based at least in part on a polling ratio involving the first connection speed and the second connection speed;

a polling module for polling the first and second associated set of PHY addresses to determine a CLAV status for each PHY address, according to the polling ratio;

a determining PHY address status module for determining whether each PHY address of the first and second connection speed requires polling; and a re-polling module for re-polling at a connection speed wherein at least one PHY address of the connection speed requires polling.

12. The system of claim 11, wherein the polling ratio is based on a number of PHY addresses of the first connection speed and a number of PHY addresses of the second connection speed.

13. The system of claim 11, further comprising: a poll ratio module for updating the polling ratio based on a number of PHY addresses of the first connection speed that require polling and a number of PHY addresses of the second connection speed that require polling.

14. The system of claim 11, wherein the determining PHY address status module further determines whether the CLAV status is an active CLAV status.

15. The system of claim 14, wherein the determining PHY address status module further determines whether the PHY address with an active CLAV status has been serviced.

16. The system of claim 11, wherein PHY addresses with an active CLAV status that have not been serviced are not re-polled wherein bandwidth is conserved.

17. The system of claim 11, wherein the polling ratio comprises a plurality of polling ratios.

18. The system of claim 17, wherein the poll ratios include 0/100, 25/75, 50/50, 75/25, 100/0 wherein each poll ratio represents the first connection speed to the second connection speed.

19. The system of claim 11, wherein one or both of the first connection speed and the second connection speed are software configurable.

20. The system of claim 11, wherein the first connection speed is a fast connection speed and the second connection speed is a slow connection speed.

21. A computer readable medium, the computer readable medium comprising a set of instructions for optimizing cell available (CLAV) status polling and being adapted to manipulate a processor to:

determine a first connection speed having a first associated set of PHY addresses and a second connection speed having a second associated set of PHY addresses;

arbitrate status polling based at least in part on a polling ratio involving the first connection speed and the second connection speed;

poll the first and second associated set of PHY addresses to determine a CLAV status for each PHY address, according to the polling ratio;

determine whether each PHY address of the first and second connection speed requires polling; and re-poll at a connection speed wherein at least one PHY address of the connection speed requires polling.

* * * * *